Figure 1:
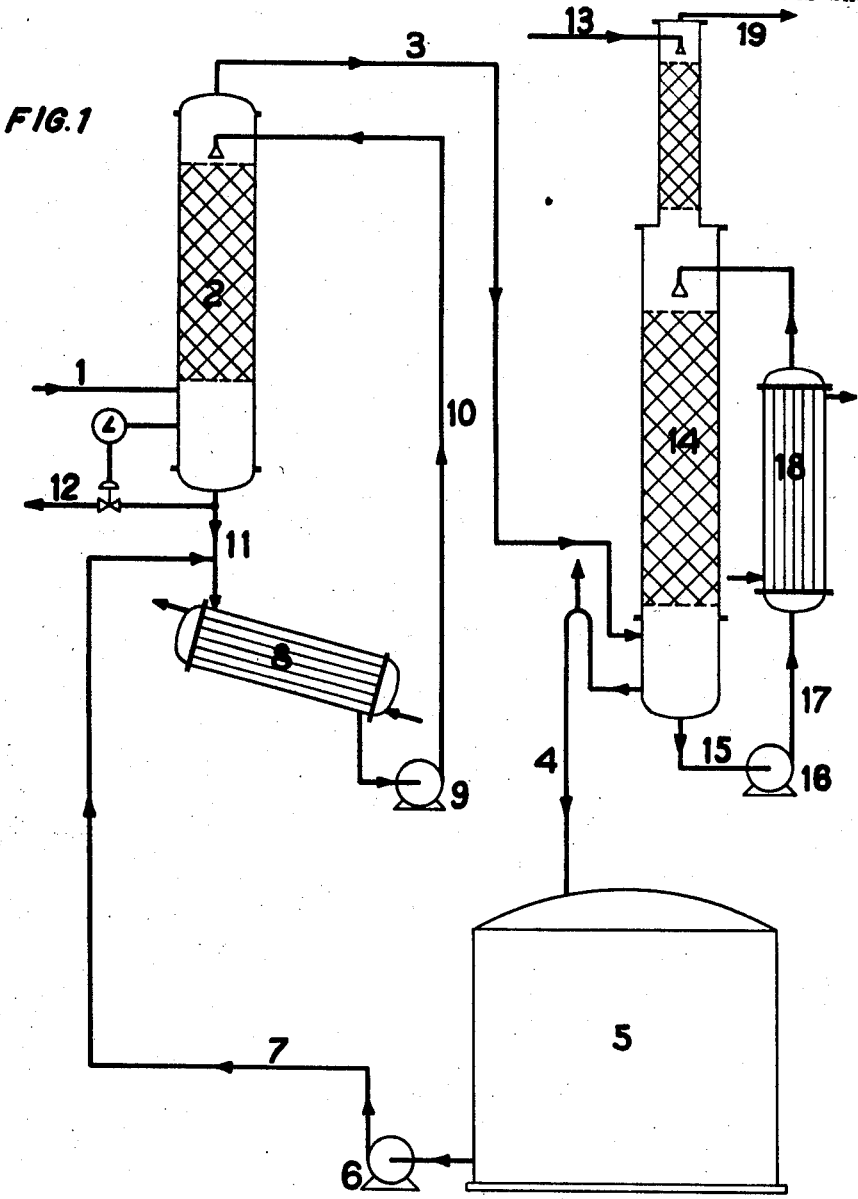

May 11, 1965  D. COSTABELLO ET AL  3,183,269
PROCESS FOR MAKING ETHYLENE DIAMINE BY TREATING ETHYLENE
DICHLORIDE WITH AMMONIA, AND SEPARATION OF VINYL
CHLORIDE FROM AMMONIA
Filed Sept. 12, 1960 2 Sheets-Sheet 1

3,183,269
PROCESS FOR MAKING ETHYLENE DIAMINE BY TREATING ETHYLENE DICHLORIDE WITH AMMONIA, AND SEPARATION OF VINYL CHLORIDE FROM AMMONIA
Dino Costabello, Novara, Camillo Merli, Milan, and Giovanni Maiorano and Gioacchino Boffa, Novara, Italy, assignors to Montecatini Societa Generale per l'Industria Mineraria e Chimica, Milan, Italy
Filed Sept. 12, 1960, Ser. No. 55,304
Claims priority, application Italy, Sept. 25, 1959, 16,024/59
5 Claims. (Cl. 260—585)

This invention relates to methods for the separation of vinyl chloride from ammonia, particularly in the production of ethylene diamine by treating ethylene dichloride with ammonia.

The amination of ethylene dichloride to ethylene diamine always occurs together with a secondary dehydrochlorination reaction yielding small amounts of vinyl chloride, ranging up to 3% of the ethylene dichloride introduced. The reaction is as follows:

$Cl-CH_2-CH_2-Cl + 2NH_3 \rightarrow 2HCl$
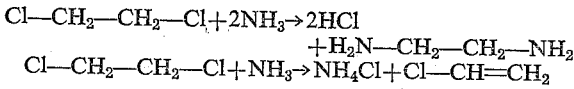
$Cl-CH_2-CH_2-Cl + NH_3 \rightarrow NH_4Cl + Cl-CH=CH_2$ Ammonia is introduced in very high excess over the stoichiometric ratio, in order to minimize the production of polyamines. Therefore, the excess of ammonia must be recycled, for economy. The vinyl chloride, which produces anion exchange resins through a series of polymerization and polycondensation reactions, accumulates in the recycle ammonia. Said exchange resins are completely insoluble in the reaction solutions, and will eventually seriously interfere with the continuous operation of the synthesis.

A sample of the above-mentioned resins had the following compositions:

| | Percent |
|---|---|
| C | 53.92 |
| Cl | 9.34 |
| H | 10.12 |
| $H_2O$ | 5.6 |
| N | 20.29 |

When anhydrous or aqueous ammonia is employed, a crude product containing the same products is obtained, namely amine hydrochlorides, ammonium chloride, ammonia in excess and vinyl chloride. In both cases, in order to recover ammonia, the crude product is caused to expand from 79–90 atm. at 100° to 9–10 atm. at 50° C. In this way most of the excess ammonia is recovered and returned to the reaction vessel. Said recycled ammonia contains most of the vinyl chloride. The crude product is then treated with a solution of NaOH in order to free the amines from the hydrochlorides and the ammonia from $NH_4Cl$, and subsequently is heated under atmospheric pressure to recover the residual ammonia, which is also recycled. Alternatively, it is feasible to expand the crude product from 10 atmospheres to 1 atm. and to then neutralize and heat it in order to achieve its complete separation from ammonia.

The applicants have found a method for purifying the recycled ammonia from vinyl chloride, and for reducing the formation of resins to an amount so small that the resins cannot hinder the synthesis reaction. Two procedures are applied for the separation of vinyl chloride. The best choice depends on whether aqueous or anhydrous ammonia is used for treating the ethylene dichloride.

When an ammonium sulphate plant is available, it is not necessary to purify the ammonia. All of the first stage expanded ammonia, or a high percentage of it, at least 50%, can be saturated with sulphuric acid. The recycled ammonia returns the vinyl chloride contained therein to the reaction vessel, but the percentage of the recycled vinyl chloride cannot reach a high and dangerous level.

When aqueous ammonia is employed in the reaction, vinyl chloride is separated, due to its low solubility in the ammoniacal solutions. The gaseous ammonia, obtained by expansion to 10 atm., is absorbed by an aqueous 24% solution of ammonia in a first tower, under 6 atm. pressure at 40° C. The unabsorbed ammonia and vinyl chloride leaving the first tower are washed with water in a second tower under atmospheric pressure. The ammonia is completely absorbed and vinyl chloride is vented.

In the herein-above described process, illustrated in FIG. 1, gaseous ammonia at 1, coming from a first expansion at 10 atm., and 24% aqueous ammonia coming from absorber 14, under atmospheric pressure, are introduced respectively into the pressure-tight washing tower 2, through pipes 1 and 7. The operating conditions are 6 atm. and about 40° C. From the top of the pressure-tight tower 2 flow both the ammonia and the unabsorbed vinyl chloride, which pass through pipe 3 to the second absorber 14, operated under atmospheric pressure and at about 40° C. Vinyl chloride exists at the top of tower 14 through 19, and is vented.

The water needed to absorb ammonia is fed in at the top of the absorber 14 through pipe 13. During absorption heat is evolved. The solution thus obtained is drawn off from the bottom of the tower through pipe 15 and is pumped at 16 through the cooler 18, and returned to the absorber 14 at a point about ⅔ of its height. A 24% ammonia solution is drawn off from the tower bottom through an overflow pipe and sent through pipe 4 to the storage reservoir 5, from which pump 6 and pipe 7 convey it to the pipe 11, where it meets the hot solution coming from the first absorber. The two solutions are mixed, cooled in the cooler 8, and, by means of the pump 9 and pipe 10, are conveyed to the top of the first absorber 2.

A 35% ammonia solution is discharged from the bottom of 2 through pipe 12. Said solution is employed in treating ethylene dichloride, upon addition of anhydrous ammonia or water in order to obtain the desired concentration.

A quantitative example follows:
The 98% ammonia fed at a ratio of 1830 kg./h., is expanded at 10 atm. It contains 0.75% vinyl chloride and is introduced through pipe 1 at the bottom of the absorber 2. The latter has a diameter of 1.1 m., being filled to a 3 m. height with Raschig rings. 500 kg./h. $NH_3$ containing 2.5% vinyl chloride, are obtained at the top of the absorber 2. Said $NH_3$ is absorbed in tower 14, at the top of which 12 kg./h. vinyl chloride exits, practically $NH_3$ free. 1600 kg./h. water are fed in at the top of tower 14; 2100 kg./h. 24% ammonia are discharged from the bottom and said ammonia is introduced into pipe 11 through apparatus 4–5–6–7 and, finally, to the top of tower 2 through pipe 10. 3430 kg./h. 53% $NH_3$ containing 0.03% vinyl chloride are discharged from the bottom of the tower 2 through pipe 12.

If anhydrous ammonia is employed in the reaction with ethylene dichloride, it is necessary to recycle anhydrous ammonia and therefore, it is unprofitable to absorb the anhydrous ammonia in water. In this case, an azeotropic ammonia-vinyl chloride distillation is applied. We have found that ammonia yields, in the presence of vinyl chloride, an azeotrope containing 67% of ammonia at a pressure of 13 atm. The azeotrope shifts to 50% under atmospheric pressure. It has a boiling point lower than that of the ammonia. The ammonia, which is expanded to 10 atm., and which contains vinyl chloride, is passed into a fractionating column from which the azeotrope is obtained as head distillation product, the tails, consisting of pure ammonia, being sent to the reactor. The fractionating column is proportioned according to the amounts of the azeotrope which are to be distilled, i.e. to the small amount of vinyl chloride. It, therefore, is small.

Figure 2:
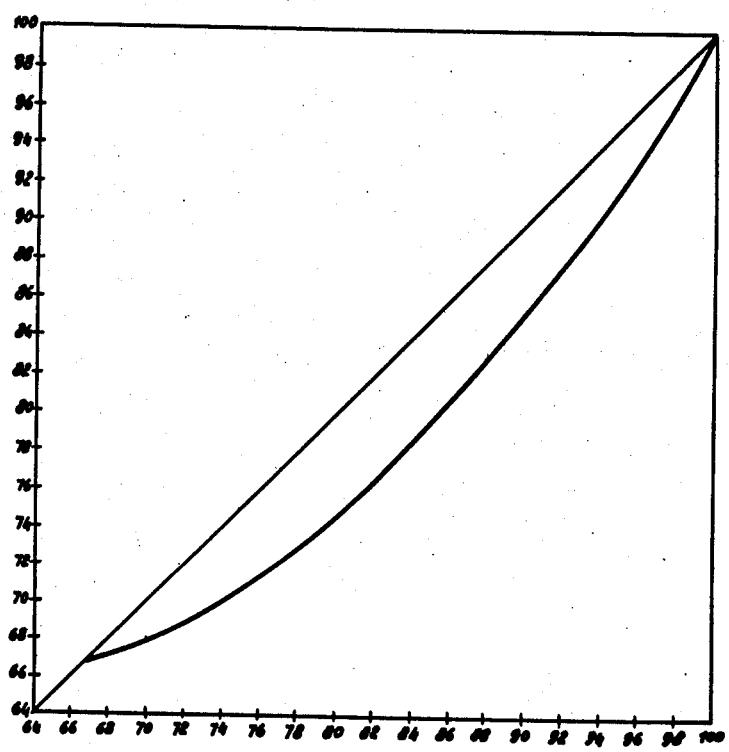

The balance curve of the ammonia-vinyl chloride mixture, at 13 atmospheres, on the right of the azeotrope, is shown in FIG. 2. The percentages by weight of the ammonia in the liquid phase are shown on the abscisses, the percentages by weight of the ammonia in the gaseous phase being shown on the ordinates. The azeotrope contains ammonia, namely about 2 kg. per kg. of vinyl chloride at 13 atm.; and 1.1 kg. per kg. of vinyl chloride at atmospheric pressure. The azeotrope is passed into water, which absorbs the ammonia, the vinyl chloride being discharged. The anhydrous ammonia which is to be recycled to react with ethylene dichloride is obtained from the aqueous solution, according to well known methods.

We claim:

1. A process for removing vinyl chloride from recycle ammonia in the production of ethylene diamine from ammonia and ethylene dichloride, which comprises withdrawing the vinyl chloride-ammonia mixture produced in the production of ethylene diamine, absorbing the ammonia in ammoniacal water at a pressure above atmospheric and below 25 atmospheres, passing unabsorbed gaseous ammonia and vinyl chloride into a second washing with water operated at substantially atmospheric pressure, employing the washing water of the first-mentioned washing, and ammonia contained therein, for reaction with ethylene dichloride to make ethylene diamine, and venting gaseous vinyl chloride from said second washing.

2. A process for removing vinyl chloride from recycle ammonia in the production of ethylene diamine from ammonia and ethylene dichloride, which comprises fractionating the vinyl chloride-anhydrous ammonia mixture, produced in the production of ethylene diamine, at superatmospheric pressure to distill off an azeotropic mixture of ammonia and vinyl chloride, absorbing the ammonia in the ammonia-vinyl chloride azeotrope by contacting with water, the vinyl chloride being substantially unabsorbed and venting the unabsorbed vinyl chloride.

3. A process of separating vinyl chloride from a gaseous mixture of water vapor, ammonia and vinyl chloride, which comprises scrubbing the gaseous mixture with ammoniacal water at 40° C. and 6 atmospheres.

4. A process of stripping vinyl chloride from a mixture of vinyl chloride and ammonia, comprising contacting said mixture with liquid anhydrous ammonia which is at a temperature below the boiling point of ammonia at the pressure of operation but above that of an azeotrope of vinyl chloride and ammonia.

5. A process of separating vinyl chloride from a gaseous mixture of water vapor, ammonia and vinyl chloride, which comprises scrubbing the gaseous mixture with ammoniacal water at a temperature from 0° C. to about 60° C. and at pressures atmospheric to 25 atmospheres.

References Cited by the Examiner
UNITED STATES PATENTS

| | | | |
|---|---|---|---|
| 1,487,768 | 3/24 | Torrey | 55—70 |
| 1,948,948 | 2/34 | Spalding | 55—70 |
| 2,769,841 | 12/53 | Dylewski | 260—583 |

CHARLES B. PARKER, *Primary Examiner.*

LEON ZITVER, *Examiner.*